(12) United States Patent
Haubs et al.

(10) Patent No.: US 9,617,775 B2
(45) Date of Patent: Apr. 11, 2017

(54) BALL-AND-SOCKET JOINT AS ENGAGEMENT POINT FOR A DRIVING ELEMENT OF A LOCKING SYSTEM

(71) Applicant: Kiekert Aktiengesellschaft, Heiligenhaus (DE)

(72) Inventors: Rainer Haubs, Voerde (DE); Sebastian Goldmann, Bochum (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 15 days.

(21) Appl. No.: 14/408,323

(22) PCT Filed: May 29, 2013

(86) PCT No.: PCT/DE2013/000294
§ 371 (c)(1),
(2) Date: Dec. 16, 2014

(87) PCT Pub. No.: WO2013/185744
PCT Pub. Date: Dec. 19, 2013

(65) Prior Publication Data
US 2015/0191958 A1    Jul. 9, 2015

(30) Foreign Application Priority Data
Jun. 16, 2012   (DE) .................... 10 2012 012 018

(51) Int. Cl.
*E05F 15/603*    (2015.01)
*F16C 11/06*    (2006.01)

(52) U.S. Cl.
CPC ........ *E05F 15/603* (2015.01); *F16C 11/0604* (2013.01); *F16C 11/069* (2013.01); *F16C 11/0652* (2013.01); *Y10T 403/32557* (2015.01)

(58) Field of Classification Search
CPC .............. F16C 11/0604; F16C 11/0638; F16C 11/0647; F16C 11/0671; F16C 11/0619;
(Continued)

(56) References Cited

U.S. PATENT DOCUMENTS 3,090,642 A * 5/1963 Gottschald .......... F16C 11/0604
403/126
3,389,925 A * 6/1968 Gottschald .......... F16C 11/0657
403/113
(Continued)

FOREIGN PATENT DOCUMENTS

| EP | 1 905 629 A2 | 4/2008 |
| JP | S63 53309 A | 3/1988 |
| JP | 2010 196847 A | 9/2010 |

OTHER PUBLICATIONS

International Search Report for corresponding patent application No. PCT/DE2013/000294 dated Oct. 29, 2013.

*Primary Examiner* — Daniel Wiley
(74) *Attorney, Agent, or Firm* — Renner, Otto, Boisselle & Sklar, LLP

(57) ABSTRACT

A ball-and-socket joint as an engagement point for a driving element, having a ball head and a socket with a bearing opening, wherein the ball head has a pin for limiting the pivoting of the ball head in the bearing opening, wherein the ball head together with the pin is at least partially arranged in the bearing opening, and wherein at least one damping element is arranged in the bearing opening in such a manner that contact of the pin with the socket is prevented during the pivoting of the ball head.

17 Claims, 2 Drawing Sheets

Figure 1:
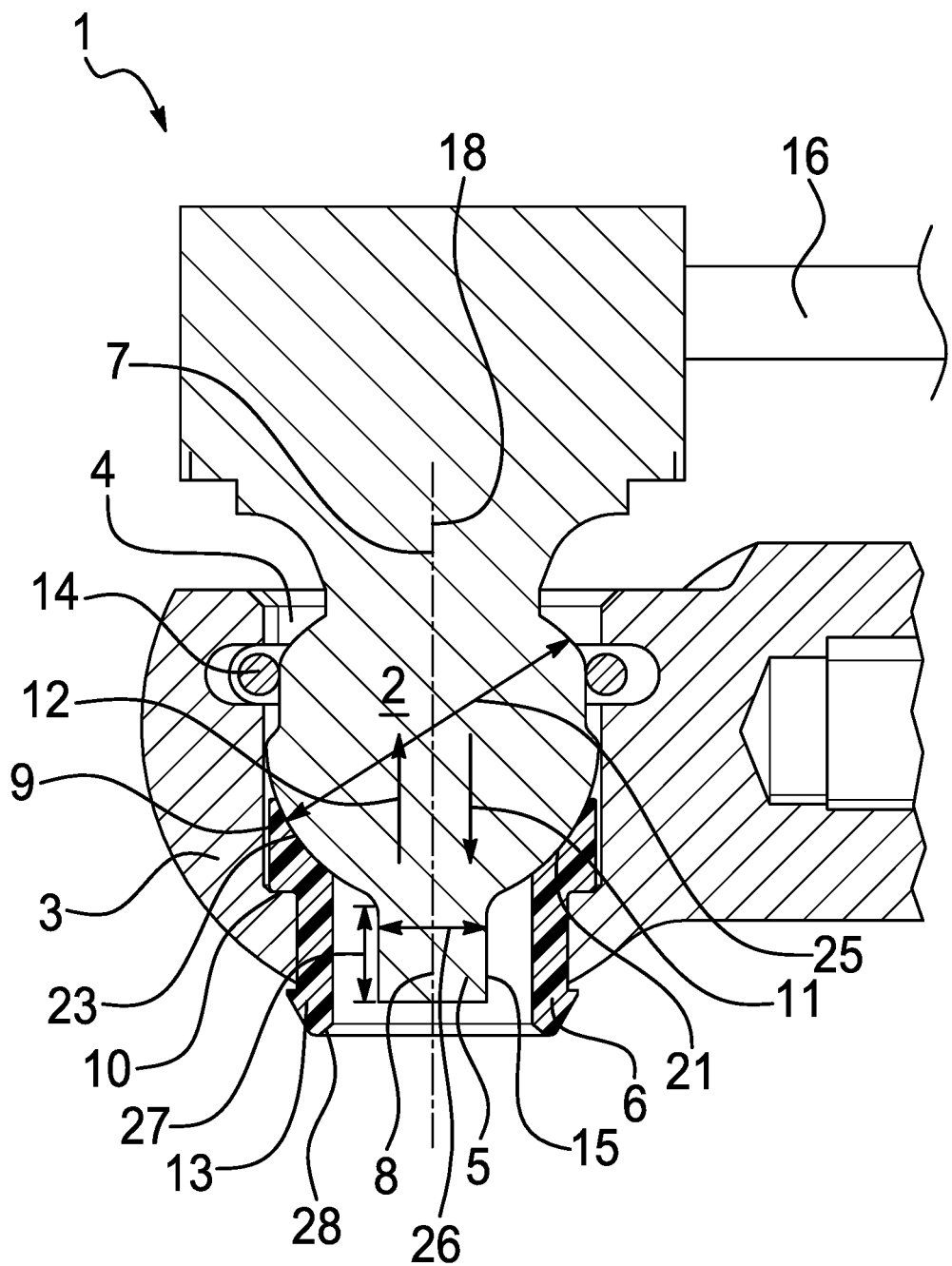

(58) Field of Classification Search
CPC . F16C 11/106; F16C 11/0652; F16C 11/0657; F16C 11/069; B60S 1/24; Y10T 403/32565; Y10T 403/32557; Y10T 403/32549; Y10T 403/32573; Y10T 403/32581
See application file for complete search history.

(56) References Cited

U.S. PATENT DOCUMENTS

| | | | | |
|---|---|---|---|---|
| 4,552,480 | A * | 11/1985 | McIntyre | B60S 1/24 403/134 |
| 4,568,216 | A * | 2/1986 | Mizusawa | F16C 11/0657 403/122 |
| 4,601,603 | A * | 7/1986 | Nakayama | F16C 11/0628 403/122 |
| 4,613,251 | A * | 9/1986 | Bellamy | F16C 11/0619 280/93.511 |
| 4,695,180 | A * | 9/1987 | Saito | B60S 1/24 15/250.17 |
| 4,750,885 | A * | 6/1988 | Ito | F16C 11/0638 403/133 |
| 4,843,898 | A * | 7/1989 | Ishikawa | B60S 1/24 15/250.31 |
| 4,902,157 | A * | 2/1990 | Ishikawa | B60S 1/24 277/504 |
| 5,013,175 | A * | 5/1991 | Hayden | B60S 1/24 15/250.27 |
| 7,083,356 | B2 * | 8/2006 | Paduano | F16C 11/0604 403/122 |

* cited by examiner

BALL-AND-SOCKET JOINT AS ENGAGEMENT POINT FOR A DRIVING ELEMENT OF A LOCKING SYSTEM

The invention relates to a ball-and-socket joint as an engagement point for a drive element and a locking system. The ball-and-socket joint and the locking system are, in particular, used for electrically operated motor vehicle doors.

Motor vehicle flaps, such as, for instance doors or tailgates are well known from prior art. Also known are electrically operated locking systems supporting the opening and closing of motor vehicle flaps in order to enhance the operating comfort of the vehicle. In particular, cable pull systems are used with the aid of which motor vehicle doors can be moved from a closed into an open position and vice versa. A respective locking system is, for instance, disclosed in EP 1 905 629 A2.

In such a locking system, two cables are guided essentially parallel to at least one guide rail of a motor vehicle flap, preferably a sliding door in the body of the vehicle. The locking system can contain respective guide surfaces and/or deflection rollers for this purpose. One end of the two cables of the cable drive is in each case secured to the motor vehicle flap. The cable ends are secured to the motor vehicle flap with the aid of fixing points in order to permanently secure the cable ends. The opposite ends of the cables are both connected to the drive. The motor vehicle flap can be opened and closed with this closing system. During a closing movement of a sliding door, the sliding door is first moved parallel to a longitudinal axis of the motor vehicle body along at least one guide rail and is then pivoted into an opening of the motor vehicle body shortly before reaching the closing position.

During this pivoting movement during which the motor vehicle flap is also pressed into door seals, a problem occurs some times with the fixing points, as the mechanical connection could become (partially) undone when exposed to considerable tensile forces thus requiring the locking system to be repaired. It has also become apparent that the change of position of the cables during the opening/closing movement can cause unwanted noises.

The invention therefore has the task of at least partially solving the technical problem apparent from prior art and providing, in particular, a ball-and-socket joint as engagement point for a drive element, offering a particularly high degree of reliability and that can also be pivoted quietly.

These tasks are solved by providing a ball-and-socket joint as engagement point for a drive element according to characteristics of claim 1. Other advantageous embodiments of the ball-and-socket joints are provided in the respective sub-claims. It must be pointed out that the individual characteristics disclosed in the sub-claims can be combined in any technologically sensible manner and define further embodiments of the invention. The characteristics disclosed in the claims are also described and explained in the description, with further advantageous embodiments of the invention being disclosed.

The ball-and-socket joint as engagement point for a drive element comprises a ball head and a socket with a bearing opening, with the ball head having a pin for limiting the pivoting of the ball head in the bearing opening, wherein the ball head together with the pin being at least partially arranged in the bearing opening and in which at least one damping element is arranged in the bearing opening in such a manner that contact of the pin with the socket is prevented during pivoting of the ball head.

The ball-and-socket joint serves as an engagement point or fixed point/installation point for a drive element, with the drive element being, in particular, a cable pull of a locking system or control rods of other moveable components of the motor vehicle flap, such as a servo lock. The drive element is, in particular, secured to the ball-and-socket joint in such a way that the driving forces of, for instance, a drive, can be introduced into the ball-and-socket joint via the drive element. For this purpose, the ball-and-socket joint contains a ball head to which the drive element is preferably secured, as well as a socket for the ball head, with the socket being, for instance, attachable to a motor vehicle flap. For this purpose, the ball head is (at least partially) rotatably arranged in the bearing opening of the socket. In order to provide the ball head and the socket with a suitable wear resistance, they are preferably made of metal. The ball head preferably has a ball diameter of 4 mm to 20 mm [millimeters] and preferably of 5 mm to 16 mm.

The ball head also contains (at least) one pin, which is preferably a cylindrical or square projection extending from the ball surface of the ball head. The diameter of the pin is preferably 1 mm to 6 mm [millimeters] and particularly preferably 2 mm to 4 mm. The ball head and pin preferably form a single piece. The pin and the ball head are at least partially arranged in the bearing opening of the socket, limiting the pivoting of the ball head in the bearing opening. This means, in particular, that a pivot angle by which a longitudinal axis of the ball head can be pivoted in relation to the centre axis of the bearing opening, is restricted by the pin (mechanical or by contact stop). It must be pointed out that the longitudinal axis is a symmetrical axis of the ball head. The maximum pivot angle is 5° to 40° and preferably 8° to 20°. In other words, the pin blocks the ball head against further pivoting when having reached a certain pivot angle. It is furthermore preferred that the pin essentially does not impede a rotation of the ball head around its longitudinal axis. By the pin limiting the pivoting movement of the ball head it is advantageously ensured that, during normal operation, the ball head cannot be levered out of the bearing opening by excessive pivoting. In order to reduce or even fully avoid undesirable noises from being produced by the ball-and-socket joint, no direct contact may exist between the pin and the socket. For this reason, at least one damping element is arranged in the bearing opening. The (at least one) damping element can, for instance, (at least partially) cover the bearing opening and/or the pin. The damping element preferably consists of a material that is softer than that of the pin of the ball head and/or socket.

Preferably the at least one damping element is at least partially made of plastic or rubber. This design of the damping element achieves a particularly good noise damping.

It is also advantageous for the at least one damping element to be arranged on the pin. This means for instance that the at least one damping element is at least partially fixed to one surface of the pin. In particular this can, for instance, also be a coating of the surface of the pin.

It is also advantageous for the at least one damping element to be tube-shaped, with the centre axis of the bearing opening aligning with a rotation axis of the at least one damping element. This design facilitates, in particular, the assembly of the at least one (separate) damping element in the bearing opening. The centre axis of the bearing opening can, for instance, be a bore axis of the bearing opening.

Preferably, the at least one damping element is secured in the bearing opening by means of an interference fit. This ensures that the at least one (separate) damping element can essentially not change its position in the bearing opening.

It is also advantageous for at least one damping element to contain a ledge and the ledge supporting the at least one damping element in a first direction parallel to the rotation axis in relation to the socket. The ledge is, in particular, a change in diameter on an external surface of the at least one damping element.

In a further embodiment, the at least one damping element contains at least one hook with the hook securing the at least one damping element, in a second direction, parallel to the axis of rotation in relation to the socket. With the at least one hook, the at least one damping element is particularly easily adjusted in the bearing opening of the socket. It is preferred that a circumferential hook (collar) or hooks spread over the circumference is/are provided.

Particularly advantageous is a design in which the at least on damping element contains a guide area for the ball head. This means, in particular, that with its external ball surface, the ball head rests at least partially against a damping element resulting in precise and low-noise guidance of the at least one ball head in the bearing opening of the support. The guide surface is therefore preferably at least partially spherical (like the ball head).

According to a further aspect of the invention, also a closing system for the motor vehicle flap is suggested, comprising at least one drive element, with the at least one drive element being secured to at least one ball-and-socket joint of the invention and in which the at least one drive element can be driven by a drive.

With reference to the general design of the locking system reference is, in particular, made to the aforementioned EP 1 905 629 A2, containing a detailed description of the drives, cable pulls and opening and closing operation.

Also, a motor vehicle is suggested that contains at least one motor vehicle flap with a locking system of the invention.

Figure 2:
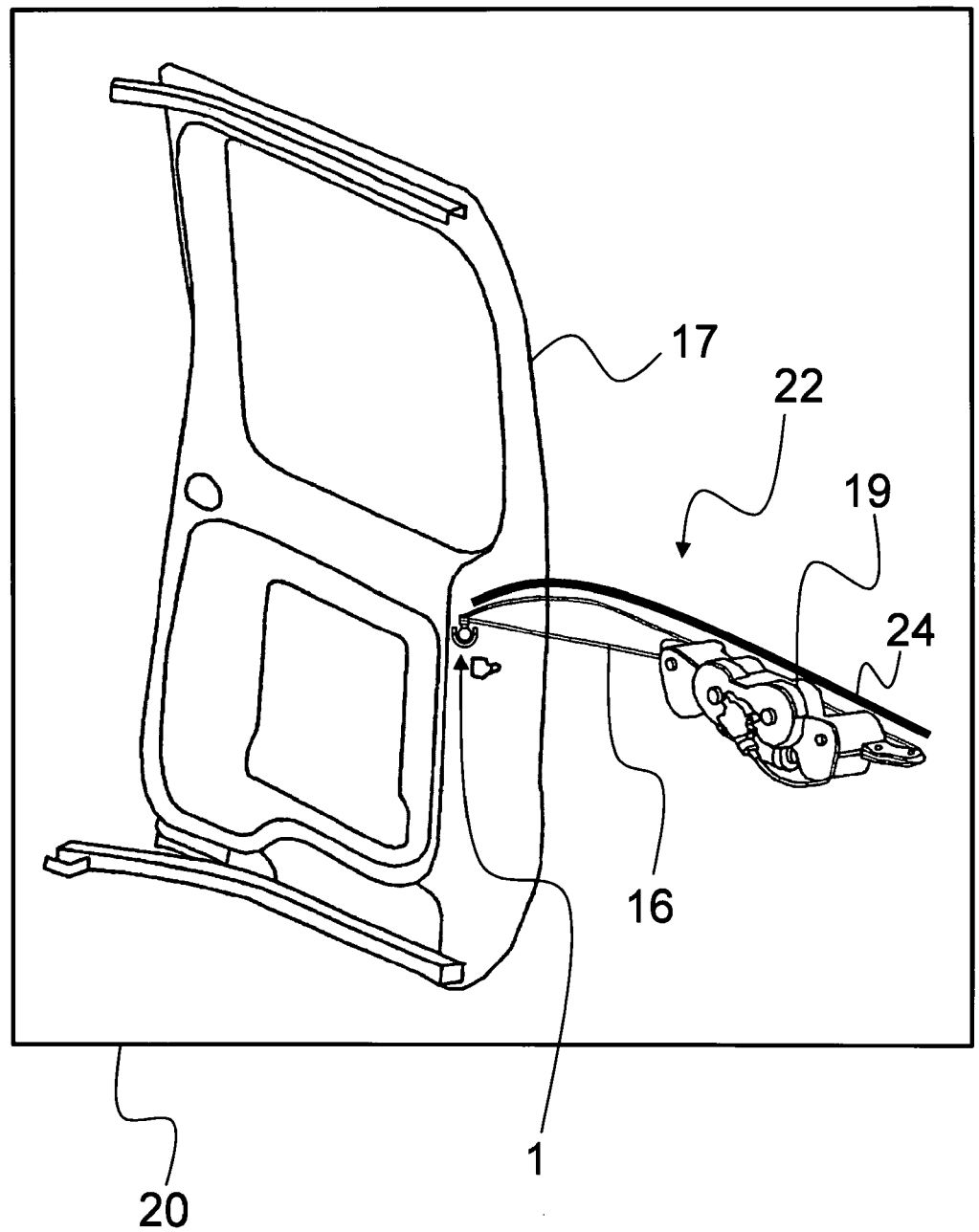

The invention and the technical details are explained in more details below with reference to the figures. It must be pointed out that the figures show particularly preferred embodiments but that the invention is not limited to these. The schematic diagrams show:

FIG. 1: a sectional view of the ball-and-socket joint and
FIG. 2: a motor vehicle with a locking system of the invention.

FIG. 1 shows a ball-and-socket joint 1 including a ball head 2, with the ball head 2 being arranged in a bearing opening 4 of a socket 3. The ball head 2 of the ball-and-socket joint 1 also contains a pin 5 extending from the ball surface 23 of the ball head 2 in the direction of the longitudinal axis 18 with a ball diameter 25 and a height 27. In one embodiment, the pin 5 is cylindrical and contains a pin diameter 26 and a surface 15. The bearing opening 4 of the socket 3 also contains a damping element 6, whose cross section is shown by hatched lines in the sectional view. The damping element 6 is also tubular and contains a rotation axis 8, being aligned with the centre axis 7 of the bearing opening 4 and the longitudinal axis 18 of the ball head 2, when the ball head 2 is in a neutral position, as shown in FIG. 1. The damping element 6 contains ledge 10 on its outer surface on which the damping element 6 supports itself in a first direction 11 in relation to the socket 3. In the embodiment, the damping element 6 extends in the first direction 11 (parallel to the centre axis 7 and to the rotation axis 8) out of the socket 3, forming a hook 13 on an end face 28, securing the damping element 6 in a second direction 12 (parallel to the centre axis 7 and to the rotation axis 8) in relation to the socket 3. The ball head 2 can be pivoted in the bearing opening 4 of the socket 3 so that the longitudinal axis 18 of the ball head 2 forms an angle with the centre axis 7 of the bearing opening 4 when the ball head 2 is pivoted out of its neutral position. This pivot movement is, however, blocked by the pin 5 as soon as the pin 5 comes into contact with the damping element 6. The ball head 2 can also be rotated around its longitudinal axis 18 in the bearing opening 4 of the socket 3. In order to prevent the ball head 2 from leaving the bearing opening 4 of the socket 3, a ring 14 is also provided in the bearing opening 4. This ring 14 blocks a movement of the ball head 2 along the second direction 12. In the first direction 11 the ball face 23 of the ball head 2 is also supported on a guide surface 21 of the damping element 6. A drive element 16 shown in this embodiment as a cable of a cable pull is also secured to the ball head 2 of the ball-and-socket joint 1.

FIG. 2 shows (schematically indicated) a motor vehicle 20 with a locking system 22, comprising the ball-and-socket joint 1 of FIG. 1, a drive element 16 and a drive 19. The ball-and-socket joint 1 is secured to a slide of the motor vehicle flap 17, so that with the aid of locking system 22, the motor vehicle flap 17 can be moved along a rail 24 fixed to the motor vehicle 20.

The ball-and-socket joint of the invention allows reliable and low-noise automatic opening of motor vehicle doors even when considerable forces are applied.

LIST OF REFERENCE NUMBERS 1 ball-and-socket joint
2 ball head
3 socket
4 bearing opening
5 pin
6 damping element
7 centre axis
8 rotation axis
9 external surface
10 ledge
11 first direction
12 second direction
13 hook
14 ring
15 surface
16 drive element
17 motor vehicle flap
18 longitudinal axis
19 drive
20 motor vehicle
21 guide surface
22 locking system
23 ball surface
24 rail
25 ball diameter
26 pin diameter
27 height
28 end face

The invention claimed is:

1. A ball-and-socket joint as an engagement point for a drive element, comprising a ball head and a socket having an inner surface defining a bearing opening, in which the ball head contains a pin for restricting pivoting movement of the ball head in the bearing opening, in which the ball head and the pin are arranged at least partially in the bearing opening, and at least one damping element having a first end adjacent the pin and a second end distally opposite from the first end, wherein the first end extends past the inner surface and out of the bearing opening, and the second end is enclosed by the inner surface defining the bearing opening in such a way that during pivoting of the ball head, contact of the pin with the socket is prevented.

2. The ball-and-socket joint according to claim 1, in which the at least one damping element is made at least partially from plastic or rubber.

3. The ball-and-socket joint according to claim 1, in which the at least one damping element is arranged on the pin.

4. The ball-and-socket joint according to claim 1, in which the at least one damping element is tube-shaped and in which a centre axis of the bearing opening is aligned with a rotation axis of the at least one damping element.

5. The ball-and-socket joint according to claim 1, in which the at least one damping element is secured in the bearing opening by means of an interference fit.

6. The ball-and-socket joint according to claim 1, in which the at least one damping element contains a ledge on its outer surface and in which the ledge supports the at least one damping element in a first direction parallel to an axis of rotation in relation to the socket.

7. The ball-and-socket joint according to claim 1, in which the at least one damping element contains at least one hook and in which the hook secures the at least one damping element in a second direction parallel to a rotation axis in relation to the socket.

8. The ball-and-socket joint according to claim 1, in which the at least one damping element contains a guide surface for the ball head.

9. A closing system for a motor vehicle flap comprising at least one drive element, in which the at least one drive element is secured to at least one ball-and-socket joint according to claim 1 and in which the at least one drive element can be driven by a drive.

10. A motor vehicle, containing at least one motor vehicle flap with the closing system according to claim 9.

11. A ball-and-socket joint that acts as an engagement point for a drive element, the ball-and socket joint comprising:
a socket having an inner surface defining a bearing opening;
a ball head that contains a pin for restricting pivoting movement of the ball head in the bearing opening; wherein the ball head and the pin are arranged at least partially in the bearing opening; and
at least one damping element having a first end adjacent the pin and a second end distally opposite from the first end, wherein the first end extends past the inner surface and out of the bearing opening, and the second end is enclosed by the inner surface defining the bearing opening in such a way that during pivoting of the ball head, contact of the pin with the socket is prevented,
wherein the at least one damping element has an outermost surface and the outermost surface has a diameter that increases from the first end of the at least one damping element toward the second end of the at least one damping element.

12. The ball-and-socket joint according to claim 11, wherein the at least one damping element includes a first outer surface that surrounds the ball head and a second outer surface that surrounds the pin, the second outer surface having a diameter that is less than a diameter of the first outer surface.

13. The ball-and socket joint according to claim 12, wherein the first outer surface and the second outer surface extend in a direction that is parallel to a longitudinal axis of the ball head.

14. The ball-and-socket joint according to claim 13, wherein the at least one damping element contains a ledge on its second outer surface that extends radially outwardly from the second outer surface.

15. The ball-and-socket joint according to claim 14, wherein the ledge extends radially outwardly to a diameter that is less than the diameter of the first outer surface of the damping element.

16. The ball-and-socket joint according to claim 11, wherein the outermost surface of the at least one damping element includes a first outer surface that surrounds the ball head and a second outer surface that surrounds the pin, the second outer surface having a diameter that is less than a diameter of the first outer surface.

17. The ball-and-socket joint according to claim 16, wherein the first outer surface and the second outer surface extend in a direction that is parallel to a longitudinal axis of the ball head.

* * * * *